(12) United States Patent
Shao

(10) Patent No.: US 8,249,248 B2
(45) Date of Patent: Aug. 21, 2012

(54) TELEPHONE WITH AN INFORMATION PANEL

(75) Inventor: Chun-Hao Shao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 337 days.

(21) Appl. No.: 12/759,692

(22) Filed: Apr. 13, 2010

(65) Prior Publication Data

US 2011/0129082 A1    Jun. 2, 2011

(51) Int. Cl.
*H04M 9/00* (2006.01)
(52) U.S. Cl. ................ 379/433.13; 455/550.1; 455/66.1
(58) Field of Classification Search ............. 379/433.13, 379/433.01, 433.04, 433.09; 455/550.1, 455/66.1; 281/44; 248/447
See application file for complete search history.

(56) References Cited

U.S. PATENT DOCUMENTS

| | | | | |
|---|---|---|---|---|
| 3,806,164 A | * | 4/1974 | Babensee | 281/44 |
| 4,120,107 A | * | 10/1978 | Bukowsky | 40/336 |
| 4,192,425 A | * | 3/1980 | Landau et al. | 211/50 |
| D267,174 S | * | 12/1982 | Fox et al. | D14/254 |
| 4,448,383 A | * | 5/1984 | Hansen | 248/447.1 |
| D276,338 S | * | 11/1984 | Pardo | D14/144 |
| 5,276,986 A | * | 1/1994 | Thomas | 40/336 |
| 5,428,210 A | * | 6/1995 | Nair et al. | 235/375 |
| D385,886 S | * | 11/1997 | Stratelak et al. | D14/240 |
| 5,818,701 A | * | 10/1998 | Shindo | 361/814 |
| 6,347,232 B1 | * | 2/2002 | de Casillas | 455/550.1 |
| 7,580,736 B2 | * | 8/2009 | Ronkko et al. | 455/575.3 |
| 2006/0187334 A1 | * | 8/2006 | Shibata et al. | 348/333.06 |

* cited by examiner

*Primary Examiner* — Olisa Anwah
(74) *Attorney, Agent, or Firm* — Altis Law Group, Inc.

(57) ABSTRACT

A telephone includes a phone body and an information panel to hold business cards. The information panel is rotatably mounted to the phone body. The phone body defines a receiving hole. The information panel includes a main body, a trigger, and a resilient element. The main body defines a through hole including a first positioning portion located in an inner surface of the through hole. The trigger includes a first end extending through the through hole, a second end received in the receiving hole, and a second positioning portion located between the first end and the second end and matches with the first positioning portion to limit the main body from rotating with respect to the phone body. The resilient element is received in the receiving hole with a first end resisted the receiving hole and a second end resisted on the second end of the trigger.

6 Claims, 5 Drawing Sheets

TELEPHONE WITH AN INFORMATION PANEL

BACKGROUND

1. Technical Field

The disclosure generally relates to telephones, and more particularly to an information panel of a telephone.

2. Description of Related Art

Telephones are indispensable communication devices in our daily lives. Business cards having useful information, such as phone numbers and addresses corresponding to names are generally independent from the telephone. When a subscriber uses the telephone, extra time is needed to find the business cards with the needed information. These business cards are prone to being misplaced or lost and can be a waste of time and inconvenient to find or locate due to their small size.

Therefore, a need exists in the industry to overcome the described limitations.

DETAILED DESCRIPTION

Figure 1:
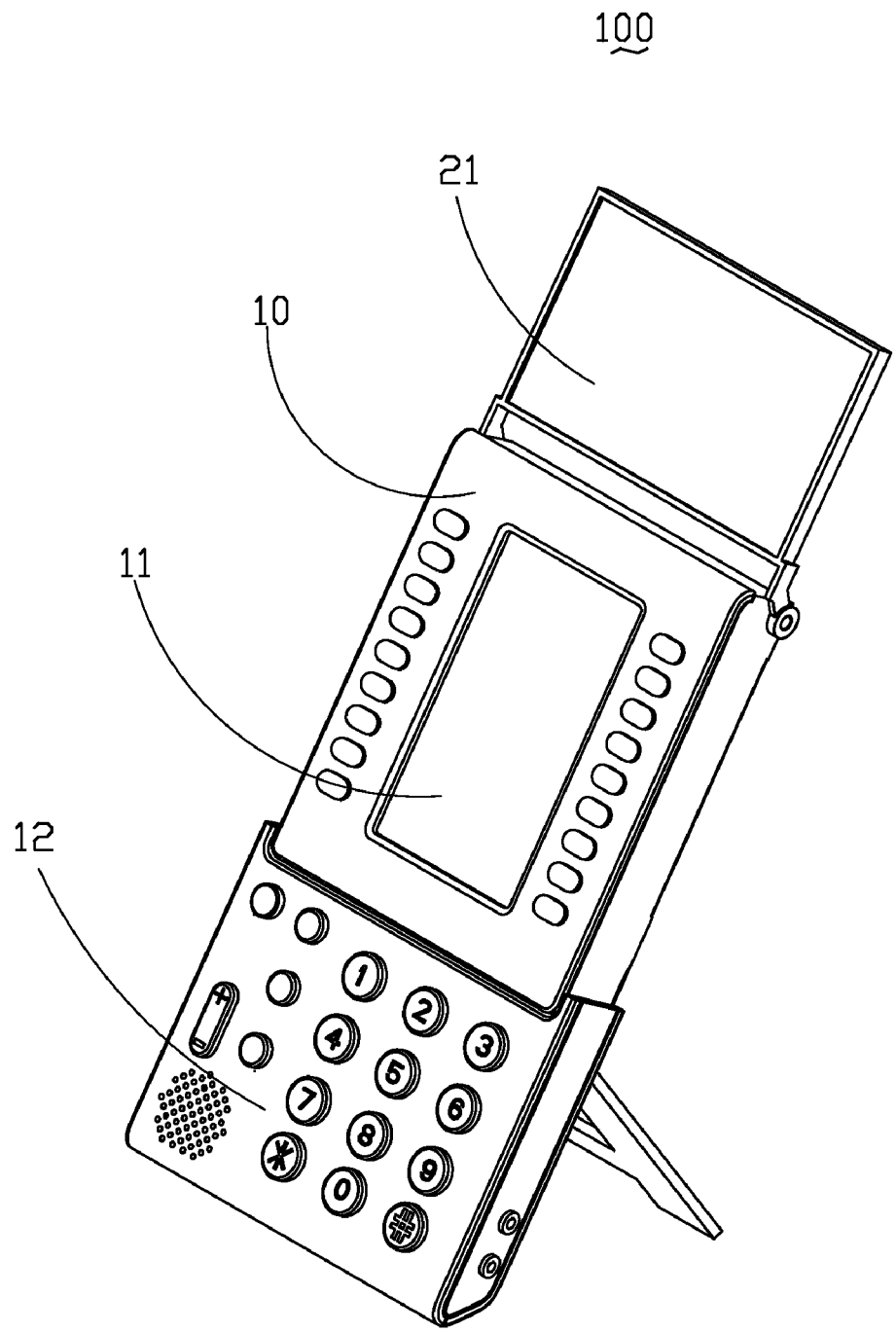
FIG. 1 is a perspective, isometric view of an exemplary embodiment of a telephone of the disclosure.
Figure 2:
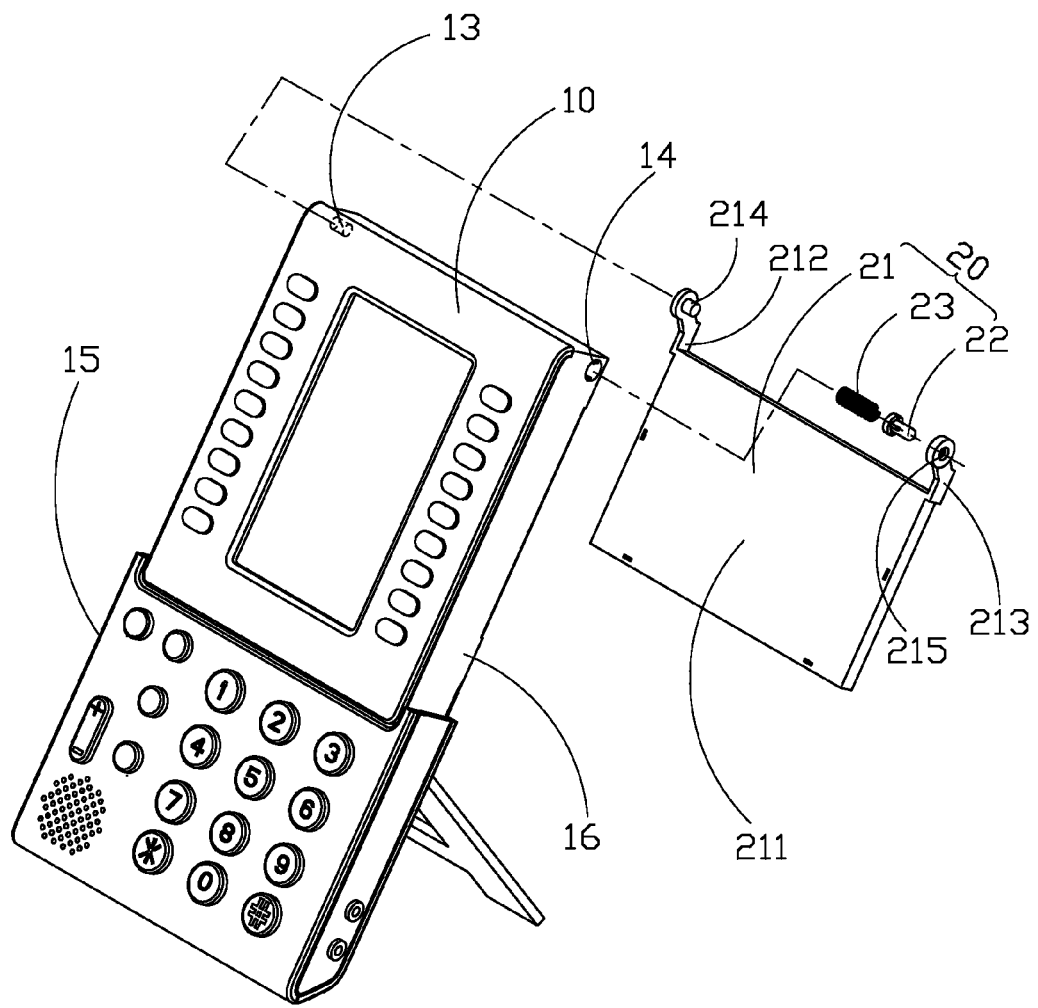
FIG. 2 is an exploded perspective view of the telephone of FIG. 1.

FIG. 1 is a perspective isometric view of an exemplary embodiment of a telephone 100 of the disclosure. FIG. 2 is an exploded perspective view of the telephone 100 of FIG. 1. The telephone 100 comprises a phone body 10 and an information panel 20 to hold business cards with information, such as phone numbers or messages. The phone body 10 comprises a displaying portion 11 for displaying information and a key board 12 for a user to input instructions to the telephone 100, such as dialing a phone number. The information panel 20 is mounted to the phone body 10 rotatably to stand at different angles, such as 150° to 180° with respect to the phone body 10, according to the convenience of the user for viewing information of the business cards held on the information panel 20.

The phone body 10 comprises a first side wall 15, a second side wall 16 opposite to the first side wall 15, and defines a shaft hole 13 and a receiving hole 14 located at the first side wall 15 and a second side wall 16, respectively. In the embodiment, the shaft hole 13 and the receiving hole 14 are coaxial.

The information panel 20 comprises a main body 21, a trigger 22 and a resilient element 23 received in the receiving hole 14. In the embodiment, the resilient element 23 is a spring.

The main body 21 comprises a receiving board 211 to hold the business cards, a first rotating portion 212, and a second rotating portion 213, where the first and second rotating portions 212 and 213 extend from two ends of the receiving board 211, respectively. In the embodiment, the first rotating portion 212 comprises a rotating shaft 214 protruding from the rotating portion 212 and towards the second rotating portion 213. In assembly, the rotating shaft 214 is received in the shaft hole 13 of the phone body 10 to allow the main body 21 to rotate with respect to the phone body 10. The second rotating portion 213 defines a through hole 215 coaxial with the rotating shaft 214, and comprises a first positioning portion 216 located in an inner surface of the through hole 215. In the embodiment, the first positioning portion 216 defines a plurality of grooves 30 evenly spaced apart from each other (referring to FIG. 3).

Figure 3:
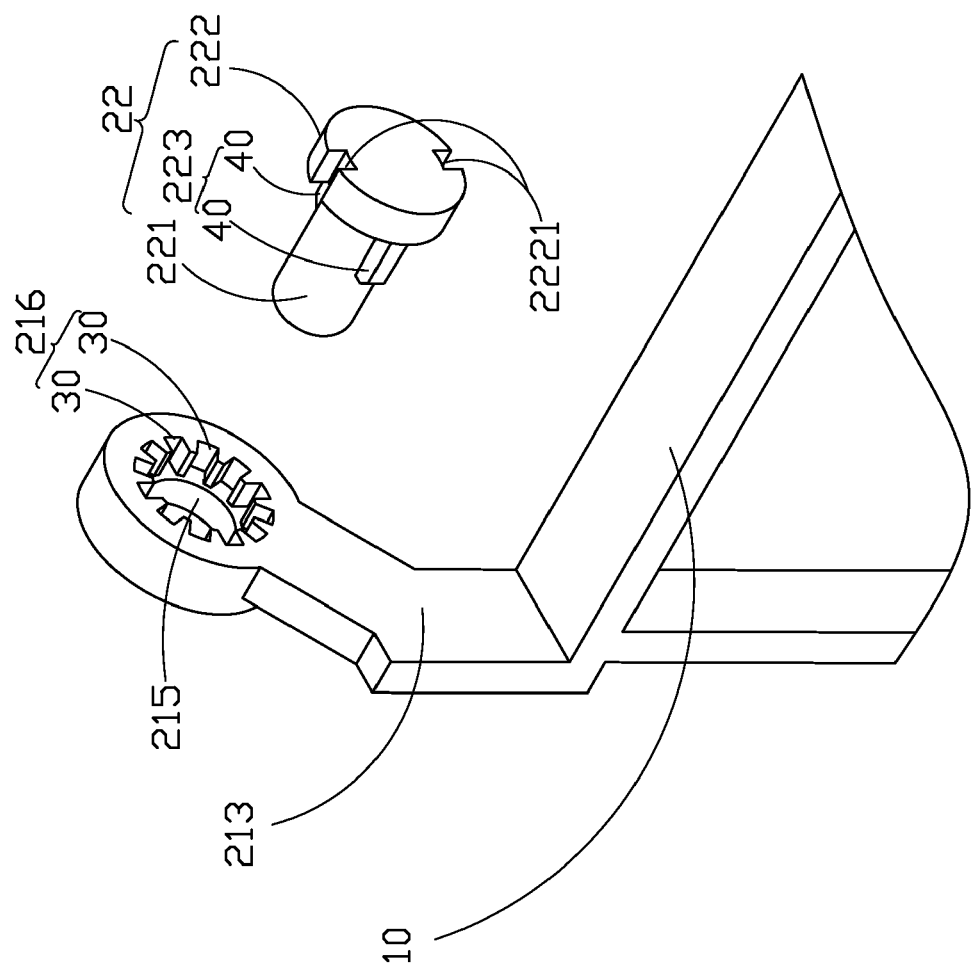
FIG. 3 is an exploded, enlarged view of a trigger and a portion of a main body of an information panel of the telephone shown in FIG. 1.
Figure 4:
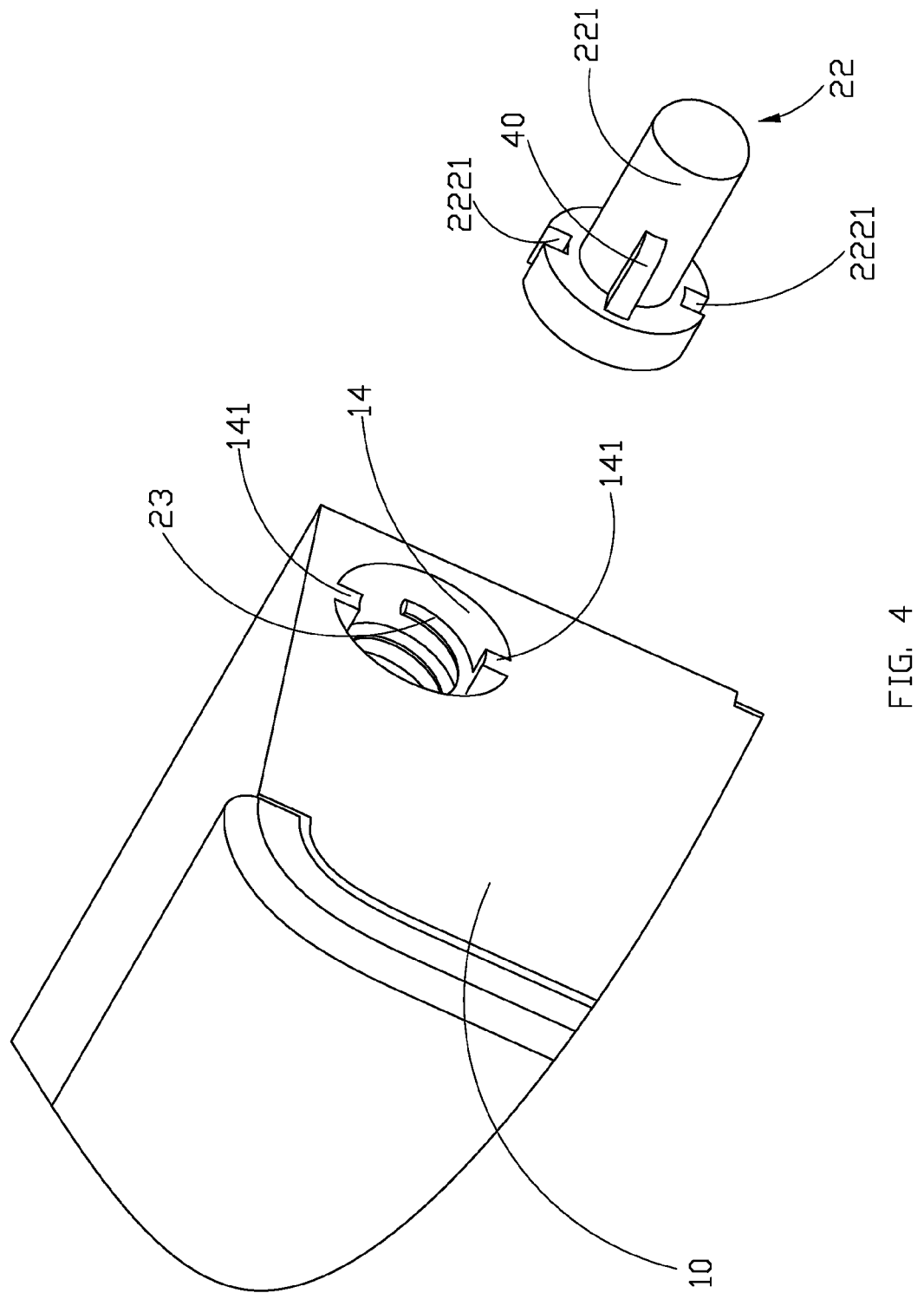
FIG. 4 is an exploded, enlarged view of the trigger and a portion of a phone body of the telephone shown in FIG. 1, in which a resilient element is received in a receiving hole of the phone body.

With reference to FIG. 3 and FIG. 4, the trigger 22 comprises a first end 221, a second end 222, and a second positioning portion 223 disposed between the first end 221 and the second end 222. In assembly, the first end 221 extends through the through hole 215 and the second positioning portion 223 matches with the first positioning portion 216 to limit the main body 21 from rotating with respect to the phone body 10. The second end 222 of the trigger 22 resists the resilient element 22 and matches with the receiving hole 14.

In the embodiment, the second positioning portion 223 comprises at least one block 40 protruding from an outer surface of the second positioning portion 223 and matched with a corresponding one of the plurality of the grooves 30 to limit the main body 21 from rotating around the first end 221 of the trigger 22.

In the embodiment, the receiving hole 14 is columniform, and the second end 222 of the trigger 22 are correspondingly columniform. The phone body 10 comprises at least one projection 141 protruding from an inner surface of the receiving hole 14. The second end 222 of the trigger 22 correspondingly defines at least one slot 2221 matched with a corresponding projection 141, so that the second end 222 of the trigger 22 cannot rotate in the receiving hole 14.

Alternatively, the receiving hole 14 can be polygonal, for example, in the shape of a quadrangle, hexagon, or octagon. Correspondingly, the second end 222 of the trigger 22 can be polygonal. In other words, the shapes of second end 222 of the trigger 22 can be changed in light of the shape of the receiving hole 14.

In assembly, the rotating shaft 214 of the main body 21 is received in the shaft hole 13 of the phone body 10. The resilient element 23 is received in the receiving hole 14. The first end 221 of the trigger 22 extends through the through hole 215 of the main body 21, the second positioning portion 223 matched with the first positioning portion 216 of the through hole 215, and the second end 222 of the trigger 22 resists the resilient element 22 and matches with the receiving hole 14. In this position, the main body 21 is rotatably mounted to the phone body 10 to hold at different angles according to convenience of the user.

In use, when the first end 221 of the trigger 22 is moved from the through hole 215, the second positioning portion 223 of the trigger 22 disengages from the first positioning portion 215 of the main body 21. In this position, the rotating shaft 214 is rotatable in the shaft hole 13, and the second rotating portion 213 is rotatable around the first end 221 of the trigger 22, to allow the main body 21 to rotate with respect to the phone body 10. When the main body 21 is rotated to a suitable angle, such as 150° to 180° with respect to the phone body 10, the first end 221 of the trigger 22 is received in the through hole 215 again, and the first positioning portion 223 reengages with the second positioning portion 216 by a force generated by the resilient element 22. In this position, the main body 21 is fixed by the first end 221 of the trigger 22 and stands at the suitable angle with respect to the phone body 10.

Figure 5:
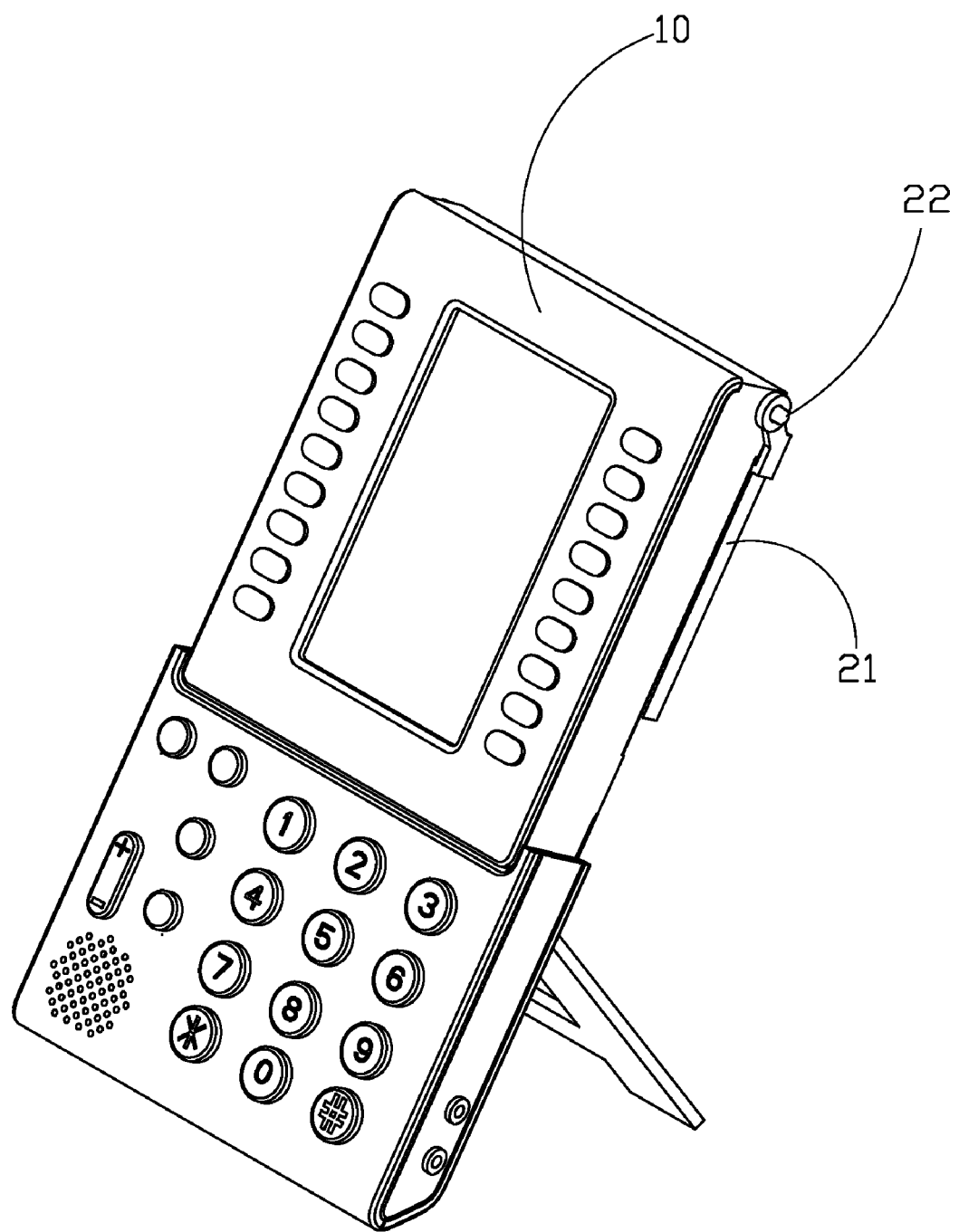
FIG. 5 is a schematic diagram of the telephone of FIG. 1, in which the main body is closed.

In the embodiment, if there is no requirement to use the information panel 20, the information panel 20 can be closed to fold with the phone body 10 (referring to FIG. 5), making the unit very compact.

While the exemplary embodiment has been described, it should be understood that it has been presented by way of example only and not by way of limitation. The breadth and scope of the disclosure should not be limited by the described exemplary embodiments, but only in accordance with the following claims and their equivalents.

What is claimed is:

1. A telephone, comprising:

a phone body; and an information panel rotatably mounted to the phone body for viewing the information panel;

wherein the phone body defines a receiving hole, and the information panel comprises:

a main body defining a through hole comprising a first positioning portion located in an inner surface of the through hole;

a trigger comprising a first end extending through the through hole, a second end received in the receiving hole, and a second positioning portion located between the first end and the second end and matches with the first positioning portion to limit the main body from rotating with respect to the phone body; and a resilient element received in the receiving hole with a first end resisted the receiving hole and a second end resisted on the second end of the trigger;

wherein when the first end of the trigger is moved from the through hole, the second positioning portion is disengaged from the first positioning portion, and the main body is rotatable around the first end of the trigger; and when the main body is rotated to a suitable angle, the first end of the trigger is received in the through hole again, the first positioning portion reengages with the second positioning portion, and the main body is fixed by the first end of the trigger and stands at the suitable angle with respect to the phone body.

2. The telephone as claimed in claim 1, wherein the first positioning portion defines a plurality of grooves evenly spaced apart from each other, and the second positioning portion comprises at least one block matched with a corresponding one of the plurality of grooves.

3. The telephone as claimed in claim 1, wherein the receiving hole is columniform, the second end of the trigger is correspondingly columniform, and wherein the main body comprises at least one projection extending from an inner surface of the receiving hole, and the second end of the trigger defines at least one slot matched with a correspond one of the at least one projection.

4. The telephone as claimed in claim 1, wherein the receiving hole is polygonal, and the second end of trigger is correspondingly polygonal.

5. The telephone as claimed in claim 1, wherein the resilient element is a spring.

6. The telephone as claimed in claim 1, wherein the phone body defines a shaft hole coaxial with the receiving hole, and the main body comprises a rotating shaft coaxial with the through hole and received in the receiving hole.

* * * * *